H. P. ADAMS.

Butter Packages.

No. 5,464. Reissued June 24, 1873.

Witnesses.

W. T. Hutchinson

Edmund Masson

Inventor.

Henry P. Adams

By atty W. P. Adams

AM. PHOTO-LITHOGRAPHIC CO. N.Y. (OSBORNE'S PROCESS.)

UNITED STATES PATENT OFFICE.

HENRY P. ADAMS, OF CLEVELAND, OHIO.

IMPROVEMENT IN BUTTER-PACKAGES.

Specification forming part of Letters Patent No. 132,555, dated October 29, 1872; reissue No. 5,464, dated June 24, 1873; application filed June 5, 1873.

*To all whom it may concern:*

Be it known that I, HENRY P. ADAMS, of Cleveland, in the county of Cuyahoga and State of Ohio, have invented an Improved Method of Packing Butter for Transportation and preserving it in a marketable condition; and that the following is a full, clear, and exact description of the same, reference being had to the accompanying drawings making a part of this specification, in which—

Figure 4:
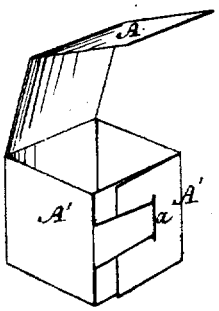
Figure 3:
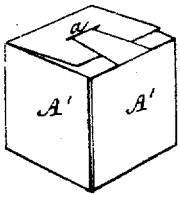
Figure 5:
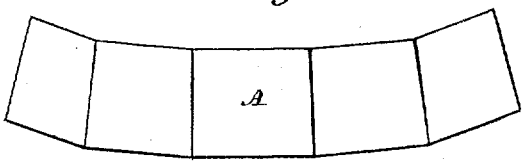
Figure 6:
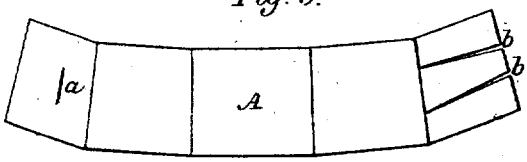
Figure 1:
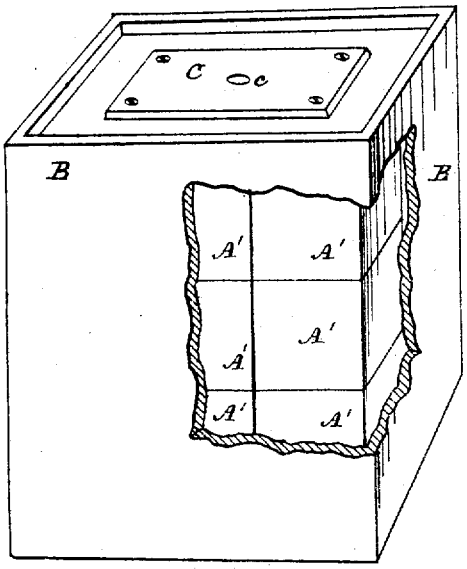
Figure 2:
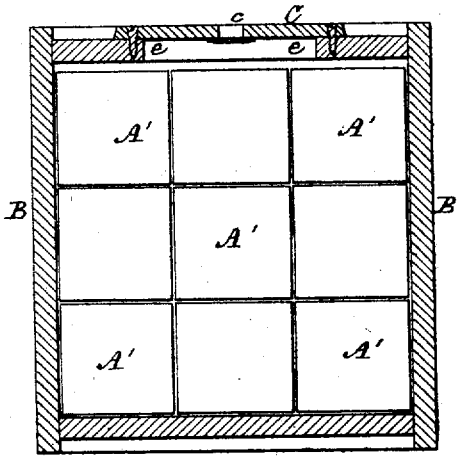

Figure 1 represents in perspective (with a portion of the sides shown as broken away) an outer case or box, in which the smaller packages are placed for preservation and for transportation. Fig. 2 represents a vertical section through the same. Fig. 3 represents in perspective one of the smaller packages of butter as it appears when closed up and ready for being placed in the outer case or box. Fig. 4 represents one of the envelopes opened up in one of its forms to receive the butter to be packed therein. Figs. 5 and 6 represent two thin wooden strips which, when cut, creased, and bent, form the envelope in which the butter is packed, preserved, and carried.

This invention consists in a process of packing butter for market in packages of one pound, more or less, and in suitable thin wooden envelopes which may afterward be removed or unfolded, leaving the shape and form of the butter intact when it is to be used. It further consists in a butter package or envelope formed of two thin strips of wood bent or folded transversely about each other and having the ends of one of said strips slotted so as to form a lock and retain said pieces in a box-form without separate fastening devices. It further consists in the combination of the small butter-packages with and packed in an exterior tight case, and with brine to fill up the interstices, whereby the butter is kept sweet and merchantable, and is safe and convenient for transportation. It further consists in an exterior rectangular packing case or box for carrying and preserving butter in packages, and so constructed as to be hermetically sealed and with a valved opening through which the brine is introduced.

To enable others skilled in the art to make and use my invention I will proceed to describe the same with reference to the drawings.

In Figs. 5, 6, A A represent thin pieces of flavorless wood. These pieces are cut into proper widths and lengths and creased crosswise where they are to be bent to form the corners of the packages. One of these pieces is cut or split at the end, as at *b*, and has a slot, *a*, at the opposite end to form a tongue and keeper, or lock to keep the envelope in shape when made and closed, as at A′.

To pack the butter in these exterior envelopes, as seen at Figs. 3 and 4, a small square box is required, and of suitable dimensions to hold a given quantity—say a pound—of butter, into which box two of the thin pieces of wood A A, or the incipient envelope, are placed, taking first the one having the slot *a* and tongue or splints *b*, Fig. 6, and bending it up at the two middle creases and placing it in the aforesaid small box, the central part of said piece A lying on the bottom and the ends projecting upward out of the box, then taking another piece of thin wood, as at Fig. 5, and bending and placing it in the box, lying crosswise of the first, with its ends also extending up out of the box. The butter is then placed on or in this partially-formed wrapper or envelope, which is in the small box and in quantity just enough to fill the envelope when closed, or nearly so, and by means of a suitable follower it is packed or pressed therein. This done, then the second piece A is bent down and folded over the top of the butter, and then the first piece A is also bent down and the central part of the split end or the tongue inserted in the slot *a*, thus confining the ends and completing the package without the use of other fastenings than those afforded by the strips themselves. The finished package may then be removed from the box, and resembles that seen in Fig. 3, A′. The two strips may, however, be folded transversely about each other to form the envelope before it is put in the box where the butter is pressed into it, and by withdrawing one of its flaps from the folded wrapper, as seen in Fig. 4, the envelope may be filled with the butter and the latter pressed, as above described, by a follower working in a box, and when completed the flap may be tucked in or against the folds of the envelope, and the finished package be the same as that shown in Fig. 3.

To pack, preserve, and transport these small packages of butter, I provide a box, B, made strong and air-tight, having in the top a hand-hole, *e*, for placing or removing the small packages inside. These boxes may be of any required dimensions to contain one dozen or a gross of the small packages. I also provide a suitable cover, C, for said box, which covers the hand-hole perfectly tight, through the center of which cover there is a hole, *c*, having a valve on its under side, so as to be self-closing, as will be explained. In the hole *c* is inserted a pipe through which brine is forced, which surrounds all the packages and fills all the interstices and keeps the valve closed. The hole *c* is also corked up tight, and thus the case is hermetically sealed and the contents will be preserved for any reasonable length of time, and may be transported to market readily and safely, as the small packages, though themselves frail, are entirely and completely surrounded in a liquid packing of brine.

When the outer box B is opened the contents will be found to be sweet and in perfect marketable condition. When it is desired to inspect the butter without unfolding the whole wrapper, it may be readily done by drawing out the flap on one of the sides, as seen in Fig. 4, and then returning it to its place again.

Having thus fully described my invention, what I claim therein as new, and desire to secure by Letters Patent, is—

1. The process of packing butter for transportation or preservation in thin wooden envelopes or packages without openings in their side, and that may be unfolded from around the inclosed butter and leave the latter intact in form, substantially as described.

2. In combination with the butter-package A′, formed of two thin strips of wood bent transversely about each other, the slots or slits in the ends of one of said pieces to form a lock and retain said pieces in box form, without other separate fastening devices, substantially as described.

3. In combination with the tight exterior case B and the rectangular butter-packages A′ A′, in close layers within it, a filling or packing of brine, which completely fills all the interstices, whereby the butter is not only kept sweet, but safely transported, substantially as described.

4. In combination with an exterior packing-case, constructed so as to be hermetically sealed, a valve that closes from the inside of the case to cover the opening through which the brine is introduced, substantially as described.

HENRY P. ADAMS.

Witnesses:
GEO. W. TIBBITTS,
P. W. PAYNE.